United States Patent Office 2,713,043
Patented July 12, 1955

2,713,043

PROCESS FOR IMPROVING THE PROPERTIES OF POLYMERIZATION PRODUCTS FROM STYRENE

Guenther Daumiller, Ludwigshafen (Rhine), Germany, assignor to Badische Anilin- & Soda-Fabrik Aktiengesellschaft, Ludwigshafen (Rhine), Germany No Drawing. Application July 7, 1950,
Serial No. 172,618

Claims priority, application Germany July 15, 1949

3 Claims. (Cl. 260—85.5)

The present invention relates to a process for improving the properties of polymerization products from styrene.

Polystyrene and also interpolymerization products from styrene and other compounds polymerizable under the same conditions, which have a softening point lying in a similar temperature range to the softening point of polystyrene, are, for many purposes, not sufficiently stable in shape at temperatures at which articles made therefrom are used in practice. In particular the stability of these polymerizates to boiling water, even to temporary contact with boiling water, is not entirely sufficient for practical requirements. It has been proposed to raise the softening point of these polymerizates, for example by treatment with specific solvents having only a limited solvent power for the polymerizates or none at all. Such processes are, however, technically troublesome and relatively expensive.

I have now found that the properties of polymerization products from styrene, i. e. polystyrene and interpolymerizates having a similar softening point to polystyrene and prepared from styrene and other organic compounds polymerizable under the same conditions, especially vinyl compounds, can be improved in a technically simple manner, in particular the softening point can be raised, by treating the polymerizates in a comminuted state at temperatures above 100° C. with steam and removing the constituents which are volatile in steam.

It has already been proposed to treat polymerizates with steam at about 100° C. in order to remove the monomers. In the case of polystyrene and interpolymerizates of styrene, this process does not lead to any appreciable raising of the softening point. Even treatment for several days with steam under atmospheric pressure brings about no appreciable improvement.

Contrary to expectation, however, a considerable increase in the softening point of the polymerizates is obtained when they are treated at temperatures above 100° C., advantageously at from about 110° to 180° C., with steam and the constituents which are volatile in steam are removed. Thus, for example, in the case of a polystyrene prepared in the absence of solvents or diluents, i. e. by bulk polymerization, and which has a thermal stability, according to Vikat "Chemie und Technologie der Kunststoffe in Einzeldarstellungen," Chemistry and Technology of Artificial Substances in Individual Presentations, volume I, by Nitsche-Pfestorf, "Testing and Evaluation of Electrotechnical Insulation Materials," page 242, of 90°, it is possible to raise the latter to about 102°. About the same result is obtained with polystyrene, which has been prepared by bead polymerization, i. e. in the presence of an aqueous solution of highly polymerized substances, such as polyvinyl alcohol, polyvinyl pyrrolidone or of inorganic colloidal dispersible substances, such as bentonite and the like, and is thereby obtained in the form of more or less fine beads.

Moreover the impact bending strength of the polymerizates is considerably increased up to 50 per cent and even more by the process of my present invention.

The process according to the present invention can most suitably be carried out by suspending the polystyrene or a corresponding interpolymerizate in water in the form of beads or small grains in a closed vessel and heating to about 110° to 180° C. by the direct introduction of superheated steam or by heating by means of a heating jacket while stirring. A steam pressure is set up depending on the temperature. The steam may be led away continuously, or by interrupting the process and releasing the pressure, and then condensed. The organic substances which have volatilized with the steam are thus separated. In most cases the individual particles of polymerizate do not agglomerate, provided the temperature of the treatment is not too high and the stirring is sufficiently vigorous. In order to ensure the avoidance of agglomeration, however, colloidal soluble or dispersible substances, such as polyvinyl alcohol, polyvinyl pyrrolidone or bentonite or talcum or polyhydric alcohols, such as glycol or glycerine, or also salts, as for example common salt, may be dissolved in the water.

When the polymerizate has been prepared by bead polymerization in a pressure vessel, the treatment according to this invention may be carried out in the same polymerization vessel, preferably by raising the temperature in the polymerization vessel and withdrawing the vapors formed either continuously or periodically.

The process may also be carried out with superheated steam alone, i. e. in the absence of water, at ordinary or reduced pressure. In this case care must be taken to ensure that the steam reaches all parts of the polymerizate; this can readily be attained by appropriate apparatus arrangements.

The following examples will further illustrate the invention but the invention is not limited to these examples. The parts are by weight unless otherwise stated.

*Example 1*

5 kilograms of granular polystyrene are suspended in 25 liters of water in a pressure-tight boiler of 40 liters capacity fitted with stirring means. The internal temperature of the boiler is raised to 145° C. by bath heating, whereby a vapor pressure of 3 atmospheres is set up. At the top of the boiler a valve is provided through which the vapors can be released from pressure into a condenser with a receiver, and condensed. After treatment for 6 hours, the releasing from pressure is commenced and this is continued until, after about 14 hours, the polystyrene is free from volatile constituents. The contents of the boiler are cooled, the polystyrene centrifuged and dried at 90° C. It has a softening point of about 102° (according to Vikat) as compared with 90° before the treatment.

*Example 2*

5000 parts of styrene containing 15 parts of benzoyl peroxide dissolved therein are heated with 25 parts of a 0.1 per cent solution of polyvinyl alcohol in water while stirring in a stirring autoclave for 16 hours at 80° C., whereby the styrene is polymerized in fine beads. The temperature in the closed vessel is then raised to 140° C. The steam formed is continuously removed and condensed. After 10 hours the polymerizate is worked up as described in Example 1. It also has a softening point of 102° as compared with the previous value of 90°.

*Example 3*

A bead polymerizate which has been prepared from a mixture of 90 parts of styrene and 10 parts of acrylonitrile and which has a mean bead size of 0.5 to 1.5 millimeters is suspended in five times the amount of water in an apparatus similar to that in Example 1 or 2 and treated for 12 hours at 150° C. at a pressure of 3.5 atmospheres while continuously releasing the pressure to allow the steam to escape. The polymerizate undergoes the same increase of the softening point as in Examples 1 and 2.

*Example 4*

5 kilograms of granular polystyrene obtained by bulk polymerization are suspended in 25 liters of a 0.5 per cent polyvinyl alcohol solution in a stirring autoclave of 40 liters capacity. While continuously releasing the pressure, the temperature is raised from 105 to 135° C. during the course of 5 hours and kept at the latter temperature for 6 hours. After cooling, the polystyrene is centrifuged off, washed and dried at 80° C. Its softening point (according to Vikat) has been increased from about 90° to 102°.

What I claim is:

1. A process for improving the properties of a polymerizate from the group consisting of polystyrene polymerizates and interpolymerizates having a similar softening point to polystyrene and prepared from styrene and other organic compounds polymerizable under the same conditions as styrene, which comprises treating a said polymerizate having a softening point below 100° C. in a granulated state, suspended in an aqueous medium, with steam at a temperature above 110° C. but below the decomposition temperature of said polymerizate and below the agglomeration temperature under the conditions of treatment, and removing the steam containing the constituents which are volatile in the steam, said treatment and said removal of steam containing volatile constituents being continued until a composition is obtained which has a softening point above 100° C.

2. A process for improving the properties of a polystyrene polymerizate which comprises treating a said polymerizate having a softening point below 100° C. in a granulated state suspended in an aqueous medium with steam at a temperature of 110° C. to 180° C. and the removing the steam containing the constituents which are volatile in the steam, said treatment and said removal of steam containing volatile constituents being continued until a composition is obtained which has a softening point above 100° C.

3. A process for improving the properties of a polymerizate of a copolymer of styrene and acrylonitrile which comprises treating a said polymerizate having a softening point below 100° C. suspended in an aqueous medium in a granulated state with steam at a temperature within the range of 110° C. to 180° C. and removing the steam containing the constituents which are volatile in the steam, said treatment and said removal of steam containing volatile constituents being continued until a composition is obtained which has a softening point above 100° C.

References Cited in the file of this patent

UNITED STATES PATENTS

| | | |
|---|---|---|
| 2,200,762 | Anderson et al. | May 14, 1940 |
| 2,350,400 | King | June 6, 1944 |
| 2,362,052 | Craig | Nov. 7, 1944 |
| 2,455,225 | Burroughs | Nov. 30, 1948 |
| 2,650,912 | Hutchinson | Sept. 1, 1953 |

FOREIGN PATENTS

| | | |
|---|---|---|
| 808,788 | Germany | July 19, 1951 |

OTHER REFERENCES

Powers, "Synthetic Resins and Rubbers," page 159, Wiley and Sons (1943).